(No Model.)
E. A. WITHAM.
PIPE COUPLING.
No. 538,634. Patented Apr. 30, 1895.
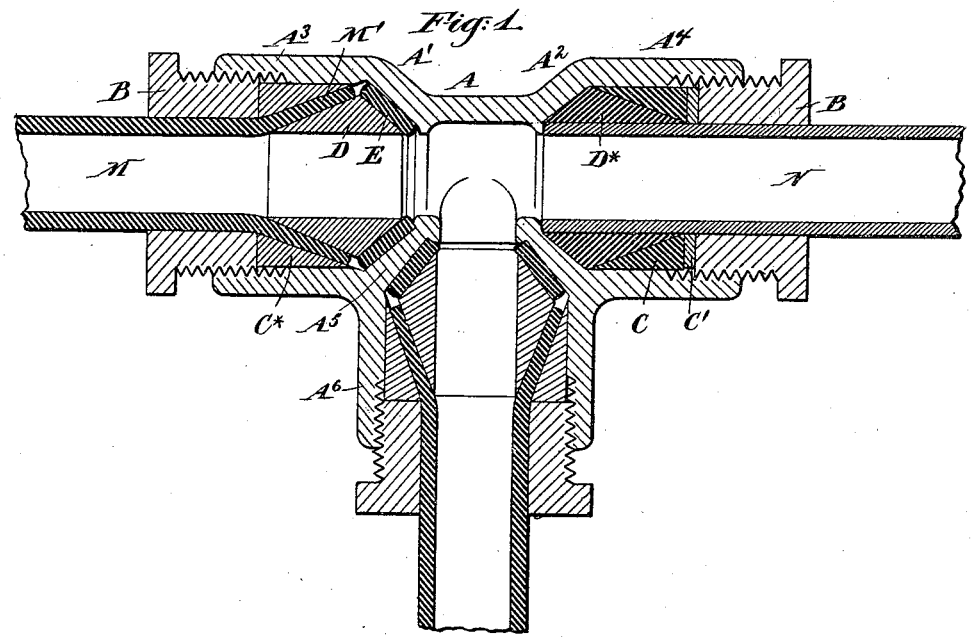
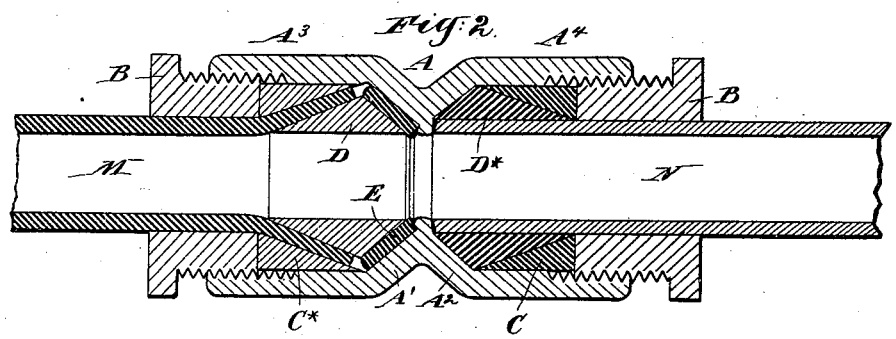
Witnesses:
Charles R. Searle,
M. F. Boyle
Inventor:
Edwin A. Witham
by his attorney
Thomas Drew Stetson

United States Patent Office.

EDWIN A. WITHAM, OF BROOKLYN, NEW YORK, ASSIGNOR TO HIMSELF AND JOHN ROBER, OF SAME PLACE.

PIPE-COUPLING.

SPECIFICATION forming part of Letters Patent No. 538,634, dated April 30, 1895.

Application filed December 20, 1893. Serial No. 494,149. (No model.)

*To all whom it may concern:*

Be it known that I, EDWIN A. WITHAM, a citizen of the United States, residing in Brooklyn, Kings county, in the State of New York, have invented a certain new and useful Improvement in Pipe-Couplings, of which the following is a specification.

My invention provides for reliably joining the ends of pipes to the couplings without flaring or cutting screw-threads on the pipe-ends, and for maintaining absolute tightness.

My invention further provides couplings adapted to join together two or more pipes which may indifferently be flared or be left plain (without flare) or one or more of which may be flared and the rest plain. The advantage of this is that it is preferred to flare soft (as lead) pipe, but to leave hard (as iron) pipe plain.

I employ a sleeve which incloses a sufficient length of the end of each pipe. The mid-length of the sleeve matches close to the exterior of the pipes, or it may extend inward between the ends to a line nearly or quite flush with the inner surfaces of the pipes at the junction; but each end of the sleeve is enlarged, first with a flaring or conical form, and finally cylindrically, and the end is partially tapped. I screw-thread a gland into the end which closes the annular space between the sleeve and the exterior of the pipe, and allows of a strong compression of the contents. Imprisoned and compressed in the space thus inclosed, is a wide ring, the inner face of which is cylindrical and the exterior is double beveled,—tapered toward each end, the taper corresponding to the flare of the sleeve.

For joining a plain pipe-end to the coupling the double beveled ring is itself of lead or analogous soft and strong material. Its interior should be of such diameter that it corresponds to the exterior of the pipe and matches thereon. Before applying this I slip the proper gland upon the pipe (which gland has the same interior diameter as the said double beveled ring so as to fit over the pipe) and follow it by a hard washer and a ring of lead or analogous material, having the proper triangular cross-section to match on the exterior of my double-beveled ring. Lastly, I apply my close fitting double beveled ring. On engaging and driving home the gland so as to properly compress these two soft rings, the junction is completed.

If there is no occasion for joining a branch, the contracted portion of the sleeve may be short. It may, in fact, disappear, and the mid-length of the sleeve may be composed entirely of two flaring portions, flared in opposite directions; but if it is required to connect a branch, the mid-length is extended equal to the diameter of the required branch, and the sleeve is formed with a nozzle adapted to join to the branch-pipe of iron or lead by the same or other efficient coupling.

The accompanying drawings form a part of this specification and represent what I consider the best means of carrying out the invention.

Figure 1 is a central longitudinal section through my invention shown as applied to join a plain-ended iron pipe to a flared pipe—that is to say, one end, the right in the figure, is united with an iron pipe, and the other, the left, to a lead pipe. This figure also shows the sleeve formed with a nozzle for a branch of the same size. The branch pipe is shown as of lead and joined to the nozzle by the same means as the main lead pipe is joined to the end of the sleeve. Fig. 2 is a corresponding section showing a modification to be used when no branch is to be joined.

Similar letters of reference indicate corresponding parts in both the figures where they appear.

A is the sleeve, which having the contracted mid-length and enlarged at each end in the manner described, serves to inclose and make an efficient junction with the two pipes. I will, when necessary, use super-numerals to designate portions of this sleeve and of the several other parts.

The flared portion of the sleeve, which extends to the left, is marked $A'$, and that which extends to the right $A^2$. The cylindrical extension beyond $A'$ is marked $A^3$ and the cylindrical extension beyond $A^2$ is marked $A^4$. A portion at the outer end of each cylindrical extension is screw-threaded internally.

B, B, are glands, correspondingly screw-threaded on their exteriors, and smoothly cylindrical on their interiors.

C and C♯ indicate rings of triangular cross section applied in the position represented, each with its outer broad edge arranged to receive the pressure of the smoothly finished end of the gland.

Referring to the left side of Fig. 1, M is a portion of a length of lead pipe, which may extend any distance, and M′ is the end portion which has been expanded in a flaring form by any suitable treatment, as by gently hammering or spinning upon the double tapered ring, which is to be ultimately received and retained there, or preferably upon another correspondingly tapered former, not shown, the former being forced inward as the expanding proceeds. The mode of joining soft pipes as lead, has been long known, but it requires a flaring of the end which is not practicable with hard pipe.

Referring to the right side of Fig. 1, N is a portion of a hard pipe of iron, or it may be brass or other hard material. It is introduced into the sleeve without requiring screw-threading or other preparation. There has been previously slipped upon this pipe the proper gland B and the proper lead ring C. In joining to such a pipe there must be previously slipped upon the pipe, in addition to the gland B and soft ring C of triangular cross-section, and washer C′, a double-beveled ring D♯ corresponding to the double-beveled ring D shown on the left side, but having its interior sufficiently larger to apply easily upon the outside of the iron pipe. In other words the interior diameters of the double beveled ring and gland correspond with each other, instead of the double beveled ring being of smaller diameter as in the arrangement used with the flared lead pipe. Its exterior must, as will be understood, be of such dimensions that it will apply within the sleeve, and its bevel should correspond approximately on one side to the flaring interior of the soft ring C, and on the other to the flaring interior of the sleeve; but it is not essential that there shall be exact coincidence of these forms, as the soft character both of the ring C and of the double beveled ring, which I designate as D♯, allows them both to change their form when the strong compression is received from the gland. The length of the flared and cylindrical portion of the sleeve must be such that when the gland is engaged and turned to compress these parts C and D♯, with proper force, the pipe N, notwithstanding the fact that its exterior may be as smooth as such pipes are usually made, will be seized friction-wise with such force as to firmly hold it. The conditions also insure so close and reliable a contact of the surfaces that there can be no leakage under any ordinary or extraordinary pressures. My experiments indicate that the proportions shown will serve.

The washer C′ of brass or other hard material is adapted to receive the friction of the gland when it is forcibly turned.

Modifications may be made without departing from the principle or sacrificing the advantages of the invention. The sleeve may be adapted to receive a branch of smaller diameter, in which case the nozzle and the several other parts should be correspondingly reduced. The contracted portion at the mid-length of the sleeve may be reduced in length until it disappears. Fig. 1 shows the invention used to connect a large branch pipe.

Parts of the invention may be used without the whole. I can make a sleeve having only one end adapted for coupling to a pipe according to my invention, while the other end is attached to a pipe by other ordinary means.

When my invention is developed at one end only of a sleeve, the other end may, among a great variety of other constructions, be adapted to be screw-threaded into the interior of a suitably formed orifice in a larger pipe or vessel.

I can use the invention with steam, gas, oil or any fluid under any usual or unusual pressure. I use the term "water" to indicate any fluid.

I claim as my invention—

1. In a pipe coupling the means for joining a plain pipe-end to the coupling, comprising a sleeve having a flared portion and an internally threaded cylindrical extension, in combination with a double beveled ring of soft material, as lead, a screw threaded gland, and a hollow conical ring, the double beveled ring being of an internal diameter to surround the pipe end and being interposed together with the hollow conical ring between the said flared portion and the said gland so as to be forced inward by the compression against the inclosed pipe-end to clamp the same, substantially as described.

2. A pipe coupling comprising a number of coupling ends (two at the least) having each a flared portion and an internally threaded extension, in combination with screw threaded glands, hollow conical rings, a double beveled ring of a diameter to surround a plain pipe-end interposed with one of the hollow conical rings between the flared portion of one coupling end and its gland, and a double beveled ring of appropriate diameter for use with a flared or with a plain pipe-end (whichever may be employed) interposed with another of the hollow conical rings between the flared portion of another coupling end and its gland, substantially as described.

In testimony that I claim the invention above set forth I affix my signature in presence of two witnesses.

EDWIN A. WITHAM.

Witnesses:
CHARLES R. SEARLE,
M. F. BOYLE.